US012445314B2

(12) United States Patent
Grover (10) Patent No.: US 12,445,314 B2
(45) Date of Patent: Oct. 14, 2025

(54) FORGET ME TOKENIZATION TABLES FOR BLOCKCHAINS

(71) Applicant: MICRO FOCUS LLC, Santa Clara, CA (US)

(72) Inventor: Douglas Max Grover, Rigby, ID (US)

(73) Assignee: Micro Focus LLC, Santa Clara, CA (US)

( * ) Notice: Subject to any disclaimer, the term of this patent is extended or adjusted under 35 U.S.C. 154(b) by 498 days.

(21) Appl. No.: 17/832,317

(22) Filed: Jun. 3, 2022

(65) Prior Publication Data

US 2023/0396454 A1   Dec. 7, 2023

(51) Int. Cl.
*H04L 9/00* (2022.01)
*G06F 16/23* (2019.01)
*G06F 16/27* (2019.01)
*H04L 9/08* (2006.01)
*H04L 9/32* (2006.01)

(52) U.S. Cl.
CPC ............ *H04L 9/50* (2022.05); *G06F 16/2379* (2019.01); *G06F 16/27* (2019.01); *H04L 9/0891* (2013.01); *H04L 9/3213* (2013.01)

(58) Field of Classification Search
None
See application file for complete search history.

(56) References Cited

U.S. PATENT DOCUMENTS

| 11,232,221 | B2 | 1/2022 | Novotny | |
|---|---|---|---|---|
| 2018/0316492 | A1* | 11/2018 | Ramachandran | ..... H04L 9/0631 |
| 2019/0370486 | A1* | 12/2019 | Wang | ..... G06Q 20/382 |
| 2021/0326815 | A1* | 10/2021 | Brody | ..... H04L 9/3239 |
| 2021/0377001 | A1* | 12/2021 | Schrage | ..... H04L 9/3239 |
| 2022/0069977 | A1 | 3/2022 | Manevich | |
| 2022/0182368 | A1* | 6/2022 | Madisetti | ..... G06Q 20/3829 |
| 2022/0391924 | A1* | 12/2022 | Yang | ..... H04L 9/3247 |

FOREIGN PATENT DOCUMENTS

| KR | 20180114915 A | 10/2018 |
|---|---|---|
| KR | 20180115282 A | 10/2018 |
| KR | 20180117124 A | 10/2018 |
| WO | WO-2021040773 A1 | 3/2021 |

* cited by examiner

*Primary Examiner* — Farid Homayounmehr
*Assistant Examiner* — Suman Debnath
(74) *Attorney, Agent, or Firm* — Sheridan Ross P.C.

(57) ABSTRACT

A transaction block in a blockchain is generated. The transaction block in the blockchain comprises a token that points to blockchain data in a tokenization table. An event is detected (e.g., an administrative event). The event is to forget the blockchain data in the tokenization table. In response to detecting the event, the blockchain data in the tokenization table is forgotten. For example, forgetting the blockchain data may comprise permanently deleting the blockchain data in the tokenization table and/or permanently deleting an encryption key for the blockchain data in the tokenization table.

20 Claims, 9 Drawing Sheets

FORGET ME TOKENIZATION TABLES FOR BLOCKCHAINS

FIELD

The disclosure relates generally to blockchains and particularly to systems and methods for forgetting/modifying data in blockchains.

BACKGROUND

One of the advantages of blockchains is that the blockchain data is highly immutable. However, the high immutability of the blockchain data may cause problems if the data stored in the blockchain needs to be removed. For example, if the blockchain contains personal data, over time (e.g., when someone leaves a company), the personal data stored in the blockchain may need to be removed to comply with privacy laws such as the General Data Protection Regulation (GDPR)/California Consumer Privacy Act (CCPA). The data in the blockchain cannot simply be removed because removing data from any block in the blockchain will cause the hashes that protect the blockchain to fail, which comprises the immutability of the blockchain.

SUMMARY

These and other needs are addressed by the various embodiments and configurations of the present disclosure. The present disclosure can provide a number of advantages depending on the particular configuration. These and other advantages will be apparent from the disclosure contained herein.

A transaction block in a blockchain is generated. The transaction block in the blockchain comprises a token that points to blockchain data in a tokenization table. An event is detected (e.g., an administrative event). The event is to forget the blockchain data in the tokenization table. In response to detecting the event, the blockchain data in the tokenization table is forgotten. For example, forgetting the blockchain data may comprise permanently deleting the blockchain data in the tokenization table and/or permanently deleting an encryption key for the blockchain data in the tokenization table.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1A:
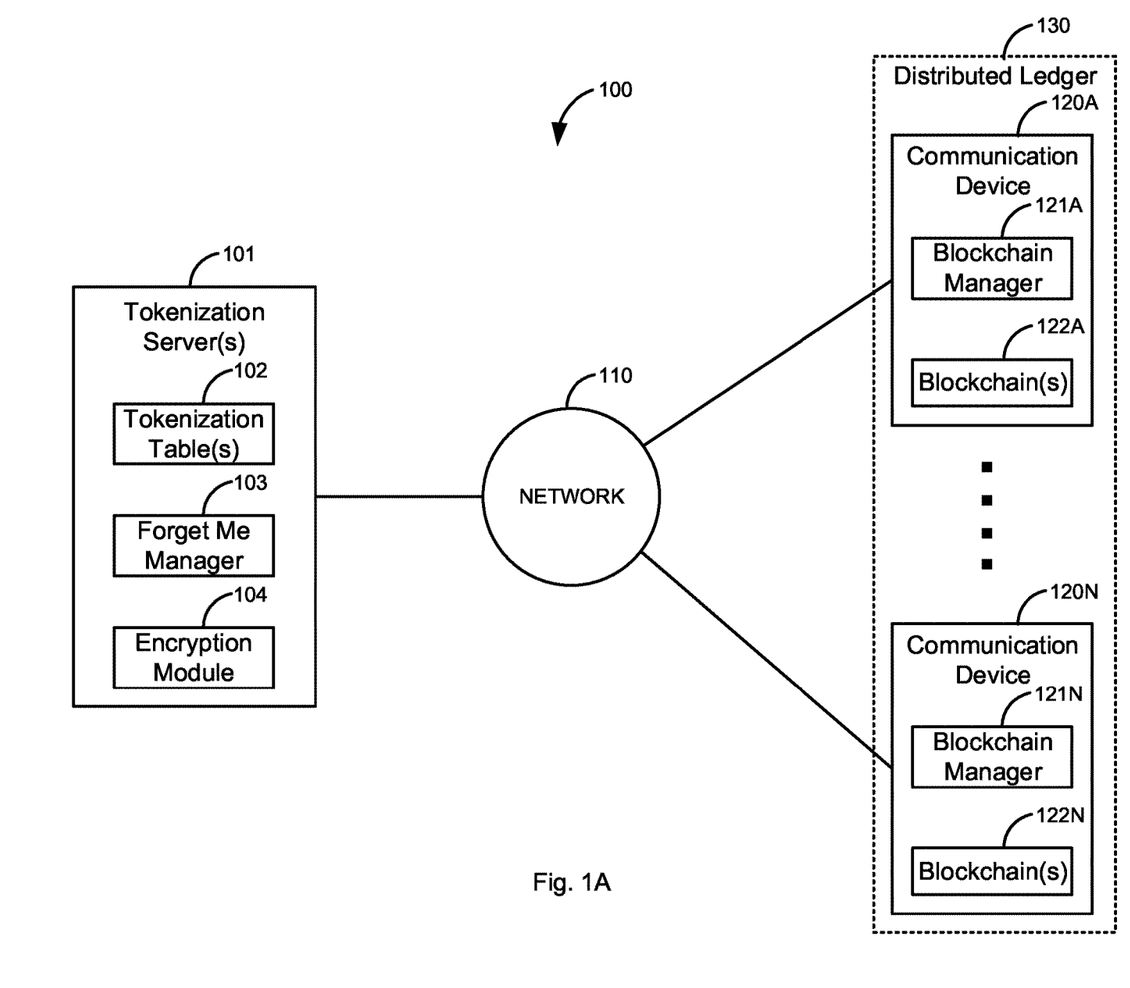
FIG. 1A is a block diagram of a first illustrative system for using a tokenization table to forget blockchain data.

FIG. 1A is a block diagram of a first illustrative system 100 for using a tokenization table 102 to forget blockchain data. The first illustrative system 100 comprises a tokenization server(s) 101, a network 110, and communication devices 120A-120N.

The tokenization server(s) 101 may be any device that can host/manage a tokenization table 102, such as, a server, a personal computer, a cloud service, a database server, and/or the like. Although shown as a separate device in FIG. 1, the tokenization server 101 may reside in one or more of the communication devices 101. The tokenization server(s) 101 further comprises tokenization table(s) 102, a forget me manager 103, and an encryption module 104. The tokenization table(s) 102 can be any known tokenization table 102 that is used to store tokens/blockchain data. For example, Tokenization Table 1 (102) shown below is an exemplary tokenization table 102 for user records. The token in the tokenization table 102 is used to locate the corresponding blockchain data.

TABLE 1

| Tokenization | |
| --- | --- |
| Token | Blockchain Data |
| AA | Data record for user A |
| BA | Data record for user B |
| NA | Data record for user N |

The forget me manager 103 is used to permanently delete blockchain data/encryption keys as part of a forget me process for the blockchain data. In some embodiments, the blockchain data in the tokenization table 102 may be encrypted. If the blockchain data in the tokenization table 102 is encrypted, the forget me manager 103 can cause the encrypted blockchain data in the tokenization table 102 to be forgotten by permanently deleting the encryption key that was used to encrypt the blockchain data.

The encryption module 104 is used to encrypt/unencrypt the blockchain data. The encryption module 104 may use any known encryption processes, such as, Data Encryption Standard (DES) encryption, triple DES encryption, Rivest-Shamir-Adleman (RSA) encryption, Advanced Encryption Standard (AES) encryption, Secure Hash Algorithm (SHA), and/or the like.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The communication devices 120A-120N can be or may include any device that can store blockchains 122/blockchain data, such as, a server, a database server, a cloud service, a personal computer, and/or the like. The communication devices 120A-120N comprise blockchain managers 121A-121N and blockchains 122A-122N. The blockchain managers 121A-121N manage the blockchains 122A-122N. In addition to creating the blockchains 122A-122N, the blockchain managers 121A-121N manage new blocks that are added to the blockchains 122A-122N in the distributed ledger 130.

The blockchains 122A-122N form a distributed ledger 130. The distributed ledger 130 is a distributed copy of the blockchains 122A-122N. The distributed nature of the blockchains 122A-122N give the blockchains 122A-122N a higher immutability of the blockchain data over existing databases.

Figure 1B:
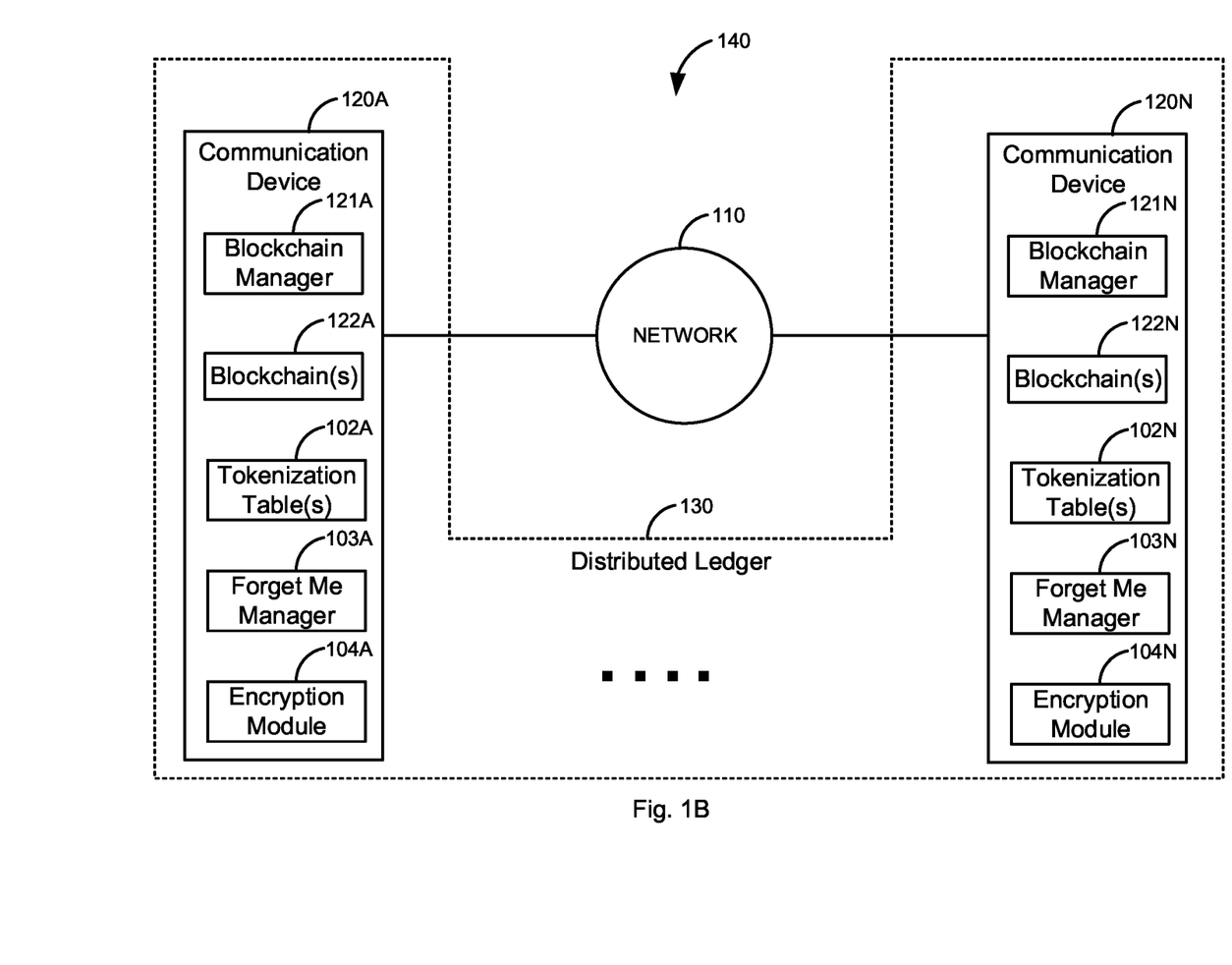
FIG. 1B is a block diagram of a second illustrative system for using distributed tokenization tables to forget blockchain data.

FIG. 1B is a block diagram of a second illustrative system 140 for using distributed tokenization tables 102A-102N to forget blockchain data. In FIG. 1B, each of the communication devices 120A-120N in the distributed ledger 130 have a distributed tokenization server 101. In addition to each communication device 120A-120N having a blockchain manager 121A-121N and a blockchain 122A-122N, each of the communication devices 120A-120N in the distributed ledger 130 have a forget me manager 103A-103N, an encryption module 104A-104N, and tokenization table(s) 102A-102N (similar to the replicated blockchains 122A-122N).

When blockchain data in the distributed tokenization tables 102A-102N is to be deleted (or an encryption key is to be deleted for the blockchain data), a consensus vote by the each of the blockchain managers 121A-121N in each of the communication devices 120A-120N takes place before the corresponding blockchain data is deleted in each of the tokenization tables 102A-102N in the distributed ledger 130/communication devices 120A-120N. While traditional blockchains 122/distributed ledgers 130 make a consensus vote to add new transaction blocks to the blockchain 122, traditional blockchains 122/distributed ledgers 130 have no concept of: deleting blockchain data using tokenization tables 102, replicated tokenization tables 102A-102N, or making any kind of consensus vote to delete any blockchain data stored in replicated tokenization tables 102A-102N. This is because traditional blockchains 122 are designed to permanently store data that cannot be deleted. The consensus vote to forget blockchain data (e.g., more than 50% approval of the blockchain managers 121A-121N) may work similar to traditional blockchain consensus votes to add new transaction blocks where a user credential (or some kind of credential) is validated by the blockchain managers 121A-121N. The first illustrative system 100 and the second illustrative system 140 may be used with any of the embodiments described herein.

Figure 2:
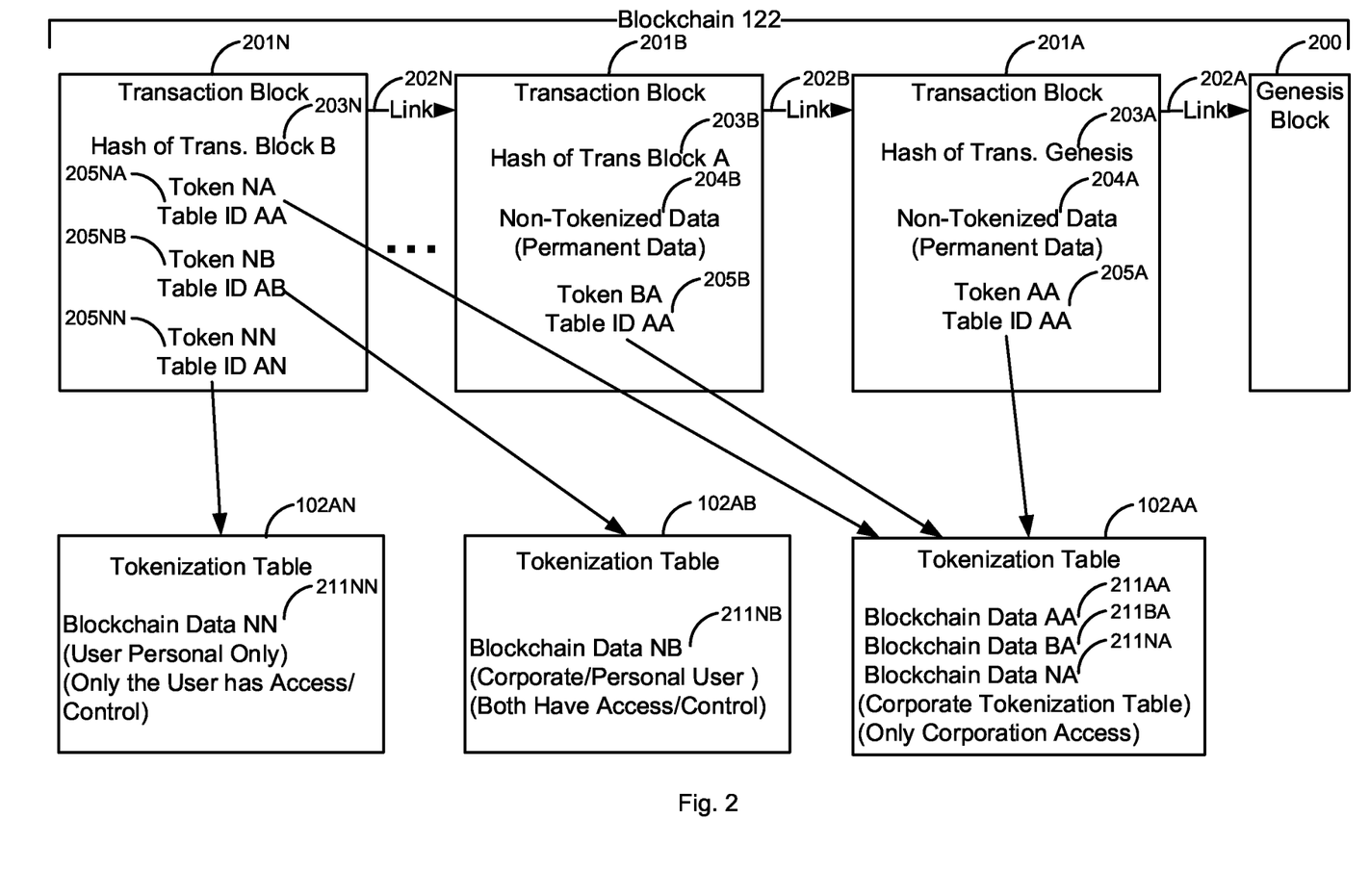
FIG. 2 is a diagram of a blockchain that uses multiple tokenization tables to forget blockchain data.

FIG. 2 is a diagram of a blockchain 122 that uses multiple tokenization tables 102AA-102AN to forget blockchain data 211AA-211NA, 211NB, and 211NN. The blockchain 122 comprises a genesis block 200 and transaction blocks 201A-201N. The genesis block 200 is the first block created in the blockchain 122. The transaction blocks 201A-201N are records that record information associated with a transaction. For example, a transaction may be a financial transaction, a software component check-in, a login record, a device activity, an event, and/or the like. The blocks 200/201A-201B are linked together by links 202A-202N. Each transaction block 201A-201N has a hash 203 of its predecessor block 200/201. For example, the transaction block 201A has a hash 203A of the genesis block 200. Likewise, the transaction block 201B has a hash 203B of the transaction block 201A. The transaction block 201N has a hash 203N of the transaction block 201B. The hashes 203A-203N are used to detect any changes to the transaction blocks 201A-201N/genesis block 200. The hashes 203A-203N provide the immutability of the blockchain 122 in the distributed ledger 130. Although not shown each block 200/201A may have a hash of itself.

The blockchain 122 uses tokens/table identifiers 205A, 205B, 205NA, 205NB, and 205NN that are stored in the transaction blocks 201A-201N of the blockchain 122 and covered by the hashes 203A-203N. The table identifier may be optional if there is only a single tokenization table 102. In FIG. 2, the transaction blocks 201A-201B contain non-tokenized blockchain data 204A-204B and tokens/table identifies (205A, 205B, 205NA, 205NB, and 205NN) for blockchain data 211AA-211NN that is tokenized. The non-tokenized blockchain data 204A-204B in transaction blocks 201A-201B is permanent non-tokenized blockchain data 204A-204B that cannot be modified/deleted because of the immutability of the blockchain 122/hashes 203A-203N.

The transaction block 201A has a token/table identifier 205A that identifies the tokenization data 211AA in the tokenization table 102AA. The transaction block 201B has a token/table identifier 205B that identifies the tokenization data 211BA in the tokenization table 102AA. The transaction block 201N has a token/table identifier 205NA that identifies the tokenization data 211NA in the tokenization table 102AA (e.g., see Transaction Table 1 described above). The transaction block 201N has a token/table identifier 205NB that identifies the tokenization data 211NB in the tokenization table 102AB. The transaction block 201N also has a token/table identifier 205NN that identifies the tokenization data 211NN in the tokenization table 102AN.

Access to the tokenization table 102AA is controlled by a first entity (e.g., a corporation). Access to tokenization table 102AB has shared access between the corporation and a user. The tokenization Table 102AN is where only the user can make changes to the blockchain data 211NN in the tokenization table 102AN. Thus, the corporation can control the blockchain data 211AA-211NA and 211NB in tokenization tables 102AA-102AB and the user can control their personal blockchain data 211NB and 211NN in the tokenization tables 102AB-102AN. For example, the blockchain data 211AA in the tokenization table 102AA may be a username. The blockchain data 211NB in the tokenization table 102AB may be address information for the user. The blockchain data 211NN in the tokenization table 102AN may be credit card numbers, bank accounts, social security numbers, birth date information, medical information, voting information, and/or the like. The blockchain data 211 referenced by the token/table identifier 205 may be a record that comprises multiple types of data/files/etc.

To forget the blockchain data 211 that is referenced by the token/table identifier 205 in the blockchain 122/transaction block 201, the corresponding blockchain data 211 in the tokenization table 102 is deleted. In this case, the blockchain data 211 would not be part of the calculated hashes 203A-203N for the transaction blocks 201A-201N/blockchain 122. This allows a user to control access to specific personal information. For example, the user may elect to delete healthcare information that is stored in the tokenization table 102AN. In the examples above, the control may be by multiple corporations and/or governments. The ability to delete and/or modify blockchain data 211NB in the tokenization table 102AB may require approval of both the user/corporate user.

Each transaction block 201A-202N may also have a separate tokenization hash (separate from the hashes 203A-203N) of the blockchain data 211 in the tokenization table 102. For example, the transaction block 201A may have a tokenization hash of the blockchain data 211AA in the tokenization table 102AA. Likewise, the transaction block 201B may have a tokenization hash of the blockchain data 211BA in the tokenization table 102AB. The transaction block 201N may have three tokenization hashes (one for each blockchain data 211NA, 211NB, and 211NN). This allows detection of whether the blockchain data 211 in the tokenization table 102 has been deleted or changed while still maintaining the immutability of the blockchain 122 with the hashes 203A-203N.

This type of blockchain structure may be useful to protect personal blockchain data 211 under laws like the GDPR/CCPA. With traditional blockchains, the non-tokenized blockchain data 204 cannot be removed, which may be an issue under the GDPR/CCPA. To comply with these types of laws, the transaction blocks 201/blockchain 122 may have an individualized structure that is designed to follow individual privacy laws for individual users. For example, if an employee resides in a country that uses the GDPR (e.g., France), the transaction blocks 201 may store non-tokenized blockchain data 204 that is allowed to be kept after the employee leaves. Blockchain data 211 that is to be deleted when an employee leaves may be stored as tokenized blockchain data 211 in the tokenization table(s) 102. When the employee leaves, the blockchain data 211 can be deleted while the non-tokenized blockchain data 204 remains in the transaction block 201. The tokenization also protects more sensitive information because access using the token 205 can be controlled where access to the blockchain 122 may be public. Depending on the privacy laws that apply to the user, the tokenization table structure may be different for different users. For example, there may be separate tokenization table(s) 102 depending on what law applies (e.g., GDPR and/or CCPA) to the specific user.

Figure 3:
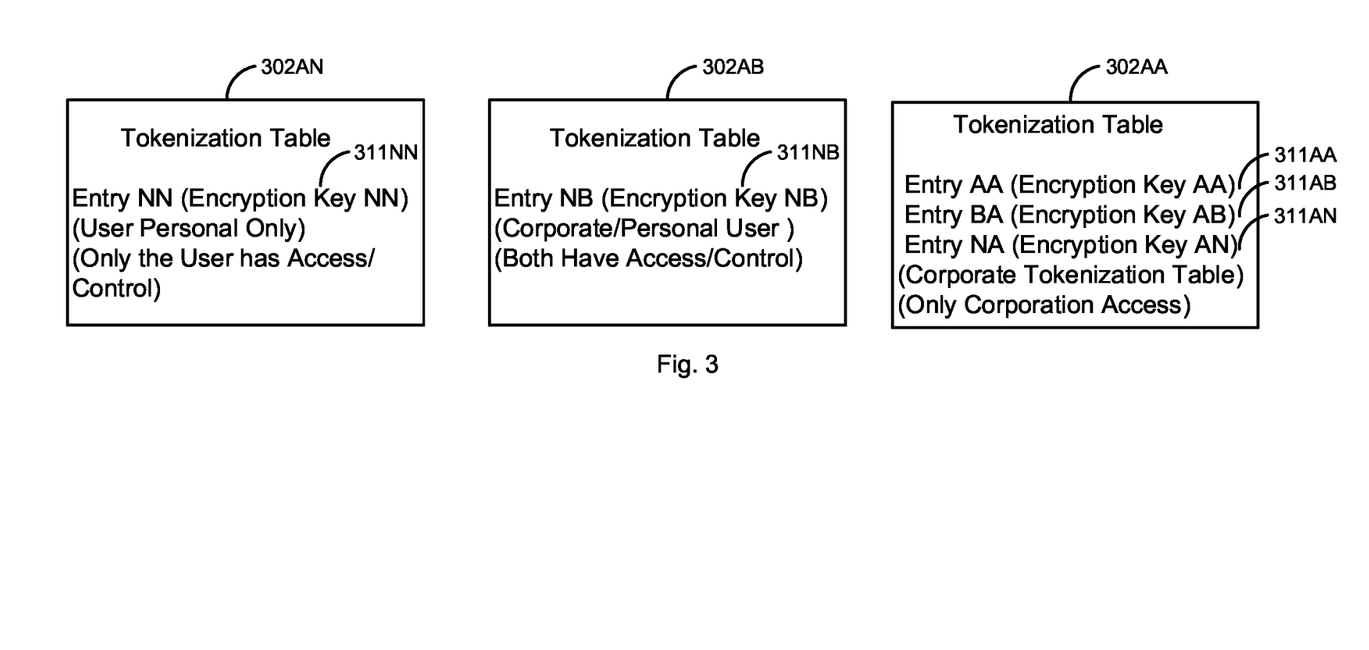
FIG. 3 is a diagram of an exemplary set of tokenization tables that use deletion of encryption keys to forget blockchain data stored in the set of tokenization tables.

FIG. 3 is a diagram of an exemplary set of tokenization tables 302AA-302AN that use deletion of encryption keys to forget blockchain data 311 stored in the set of tokenization tables 302AA-302AN. The tokenization tables 302AA-302AN comprise encrypted blockchain data 311AA, 311AB, 311AN, 311NB, and 311NN. In this embodiment, the encrypted blockchain data 311AA, 311AB, 311AN, 311NB, and 311NN in the tokenization tables 302AA-302AN may be included as part of the hashes 203A-203N for the blockchain 122. The tokenization tables 302AA-302AN are encrypted versions of the tokenization tables 102AA-102AN in FIG. 2. In this embodiment, deleting the encrypted blockchain data 311 in the tokenization table 302 will cause the hash calculation for the transaction block 201/blockchain 122 to fail.

However, the encrypted blockchain data 311 can still be forgotten. The encrypted blockchain data 311 in the individual entries in the tokenization tables 302 is encrypted using separate encryption keys. In another embodiment, there may not be a separate encryption key for each blockchain data 311. To forget the encrypted blockchain data 311 stored in the individual records in the tokenization tables 302, the encryption key is permanently deleted. Once the encryption key is permanently deleted, the encrypted blockchain data 311 cannot be unencrypted. This preserves the integrity of the hashes 203 in the blockchain 122 while still allowing for the encrypted blockchain data 311 to be forgotten. In this embodiment, only the users with the proper permissions (e.g., the corporation for tokenization table 302AA, the user/corporation for tokenization table 302AB, and the user for tokenization table 302AN) will have access to the encryption keys to permanently delete the specific encryption key(s).

While FIG. 3 shows each encrypted blockchain data 311AA, 311AB, 311AN, 311NB, and 311NN in the tokenization tables 302AA-302AN being encrypted, in one embodiment, some of the blockchain data 211 in a tokenization table 302 may not be encrypted (a mixed encryption table). In addition, some of the blockchain data 311 may use different encryption algorithms/encryption levels. For example, the encryption keys used in tokenization table 302A may use 64-bit Data Encryption Standard (DES) encryption and the tokenization table 302B may use 128-bit Rivest-Shamir-Adleman (RSA) encryption. The encrypted blockchain data 311 in the same tokenization table 302 (e.g., tokenization table 302A) may use different encryption algorithms/encryption levels for different blockchain data (e.g., 311AA, 311AB, and 311AN). The user/administrator may define the encryption type/level for each entry on an entry-by-entry (or group) basis.

Figure 4:
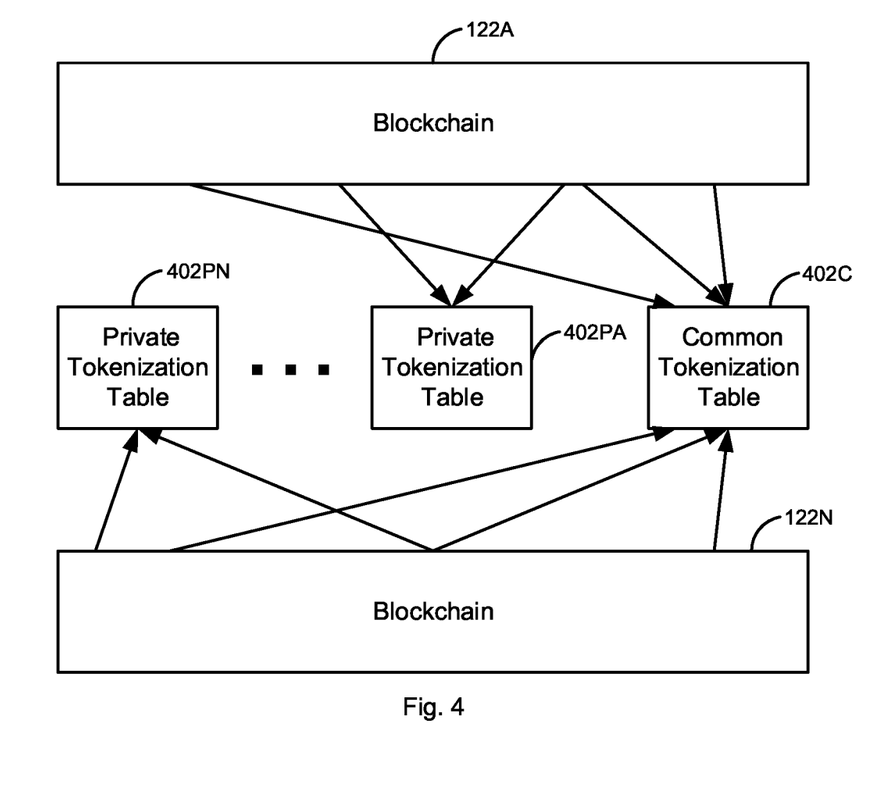
FIG. 4 is a diagram of where multiple blockchains can use private and common tokenization tables for forgetting blockchain data.

FIG. 4 is a diagram of where multiple blockchains 122A-122N can use private tokenization tables 402PA-402PN and a common tokenization table 402C for forgetting blockchain data 211/311. The processes described herein can be extended to where multiple blockchains 122A-122N may share a common tokenization table 402C in addition to having one or more private tokenization tables 402PA-402PN. The arrows in FIG. 4 indicate where the tokens/table identifiers 205 in the individual transaction blocks 201 indicate the particular tokenization tables 402PA-402PN/402C/blockchain data 211/311 that are associated with the token 205.

For example, two different blockchains 122A-122N (e.g., owned by two different entities or the same entity) may have tokens/table IDs 205 that point to the common tokenization table 402C. In other words, different transaction blocks 201 in different blockchains 122A-122N may have blockchain data 211/311 that are part of the common tokenization table 402C (e.g., for less secure data/common data). At the same time, the blockchains 122A-122N may have respective individual private tokenization tables 402PA-402PN. For example, as shown in FIG. 4, the blockchain 122A has the private tokenization table 402PA and the blockchain 122N has the private tokenization table 402PN. The common tokenization table 402C may be shared by two different service providers that use the same cloud service/blockchain data 311 (e.g., customer data). In this example, the shared cloud service may be used to store/provide the common data in the common tokenization table 402C. The private tokenization tables 402PA-402PN will likely have more secure/private data (but not necessarily). This type of structure can also be used to partition data using the common tokenization table 402C/private tokenization tables 402PA-402PN to be compliant with the GDPR)/CCPA.

The processes of tokenization tables 102/302, access, encryption, and forget me as discussed above in FIGS. 2-3 could all be used in various combinations of the embodiment described in FIG. 4. For example, the common tokenization table 402C may have shared access between two entities and the blockchain data 211 in the common tokenization table 402C is not part of the hashes 203. In this example, the private tokenization table 402PA is not only private (at the corporate level), but also has the individual tokenization data 311 hashed as part of the blockchain 122A hashes and is encrypted using (e.g., using 64-bit RSA) to allow forgettability by permanently deleting the associated encryption key. The tokenization table 402PN may be different, (e.g., with 1024-bit Secure Hash Algorithm (SHA) encryption) and personal user access instead of corporate access.

In FIG. 4, the transaction blocks 201 in different blockchains 122A-122N may point to the same blockchain data 211/311 in the common tokenization table 402C. The username/address record may be common between both blockchains 122A/122N. For example, the user Jane Doe may be associated with transaction A in the blockchain 122A and the transaction N in the blockchain 122N. Thus, both blockchains 122A-122N point to the same blockchain data 211/311 (for the user Jane Doe) in the common tokenization table 402C.

Figure 5:
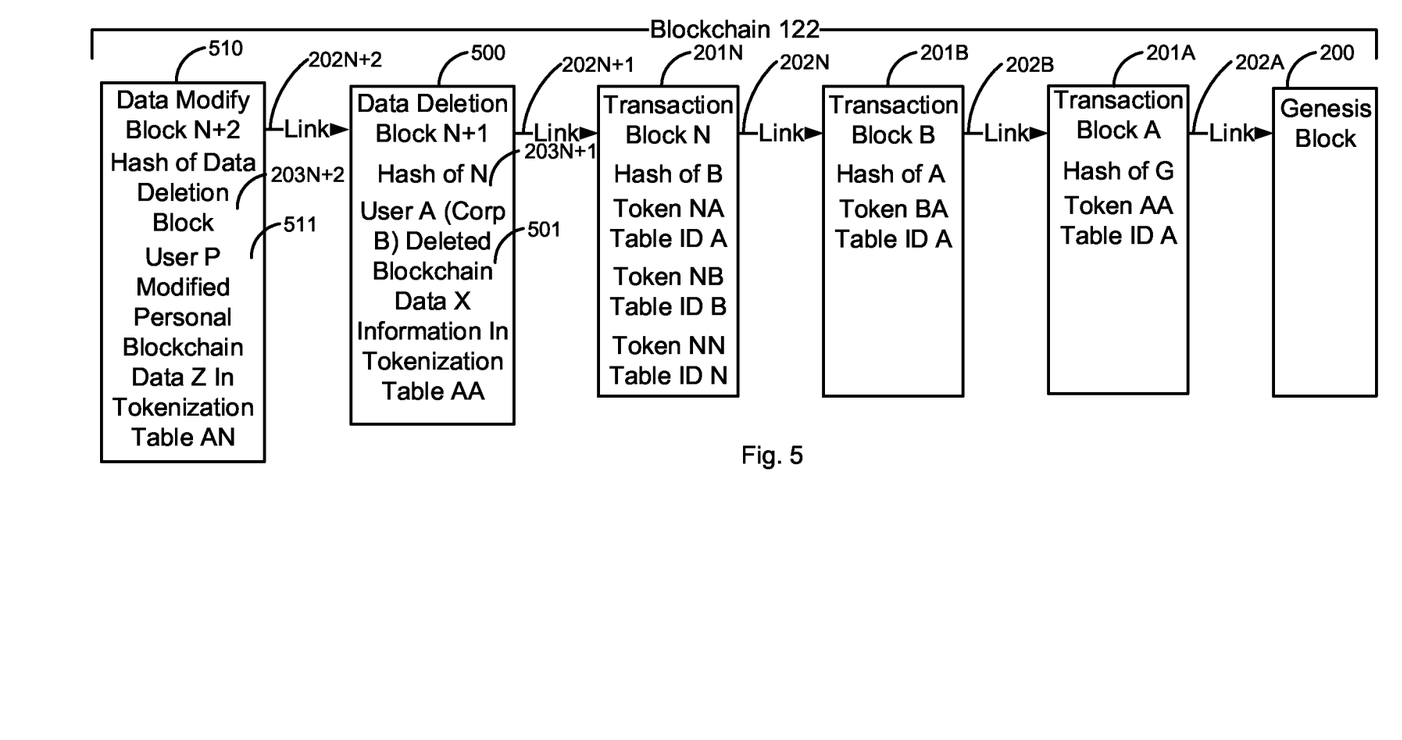
FIG. 5 is a diagram of an exemplary blockchain that has a data deletion block and a data modification block.

FIG. 5 is a diagram of an exemplary blockchain 122 that has a data deletion block 500 and a data modify block 510. The blockchain 122 of FIG. 5 has the same genesis block 200/transaction blocks 201A-201N as described in FIG. 2. When the blockchain data 211/311 is forgotten (e.g., deleted or the encryption key is deleted) and/or modified in the tokenization tables 102/302/402, the deletion/modification can be tracked in the blockchain 122.

The data deletion block 500, shows that the user A (corporation B) deleted blockchain data X 211 in the tokenization table 102AA in entry 501. When the data deletion block 500 is added to the blockchain 122, the data deletion block 500 also has a link 202N+1 back to the transaction block 201N. The data deletion block 500 also has a hash 203N+1 of the transaction block 201N. There may be a credential/token in the data deletion block 500 of which user(s) deleted the blockchain data 211/311/encryption key associated with the transaction. If the deletion of the encrypted blockchain data 311 is deleting an encryption key, the data deletion block 500 may indicate that an encryption key was deleted and the user(s) who deleted the encryption key.

User P modified personal blockchain data Z 211 in the tokenization table 102AN as shown in the entry 511 in the data modify block 510. When the data modify block 510 is added, the data modify block 510 also has a link 202N+2 back to the data deletion block 500. The data modify block 510 also has a hash 203N+2 of the data deletion block 500. There may also be a credential/token in the data modify block 510 when a user modifies the blockchain data 211 in the tokenization tables 102.

The process of FIG. 4 could be applied to the structure of FIG. 5. For example, if the blockchain data 211/encryption key associated with the blockchain data 311 in the common tokenization table 402C is deleted, both blockchains 122A/122N in FIG. 4 would have a corresponding data deletion block 500. If the tokenization table 402PA is private, then there would be a single data deletion block in the corresponding blockchain 122. Likewise, the same process for FIG. 4 could be used for the data modify block(s) 510.

Figure 6:
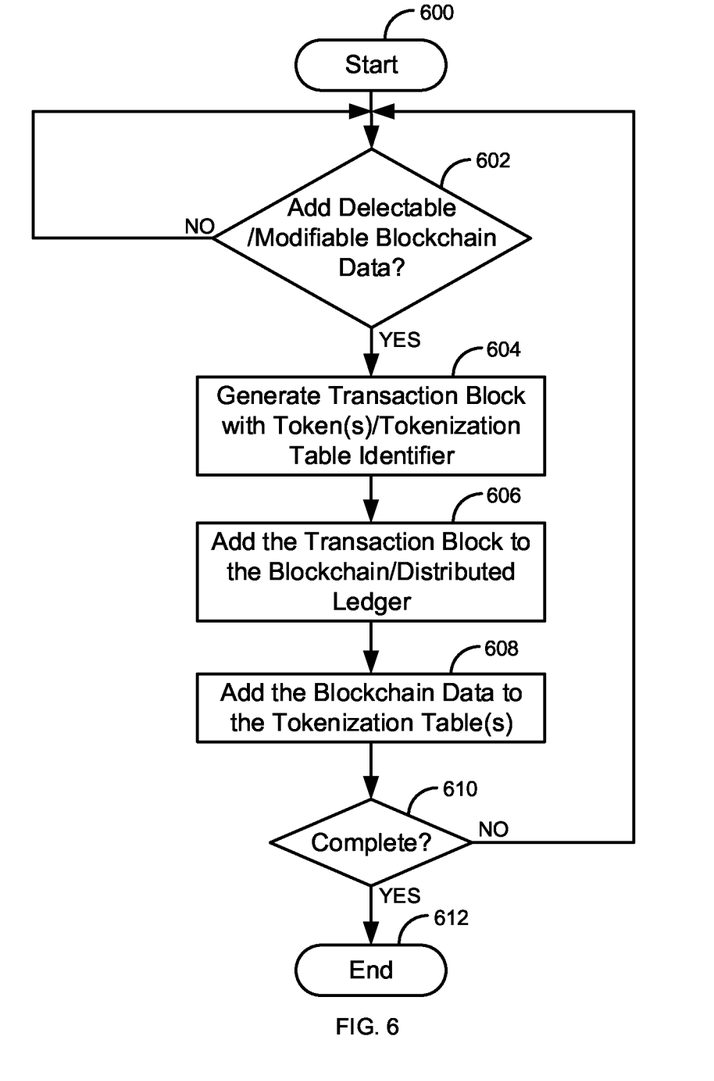
FIG. 6 is a flow diagram of a process for adding forgettable blockchain data to a blockchain by using tokenization tables.
Figure 7:
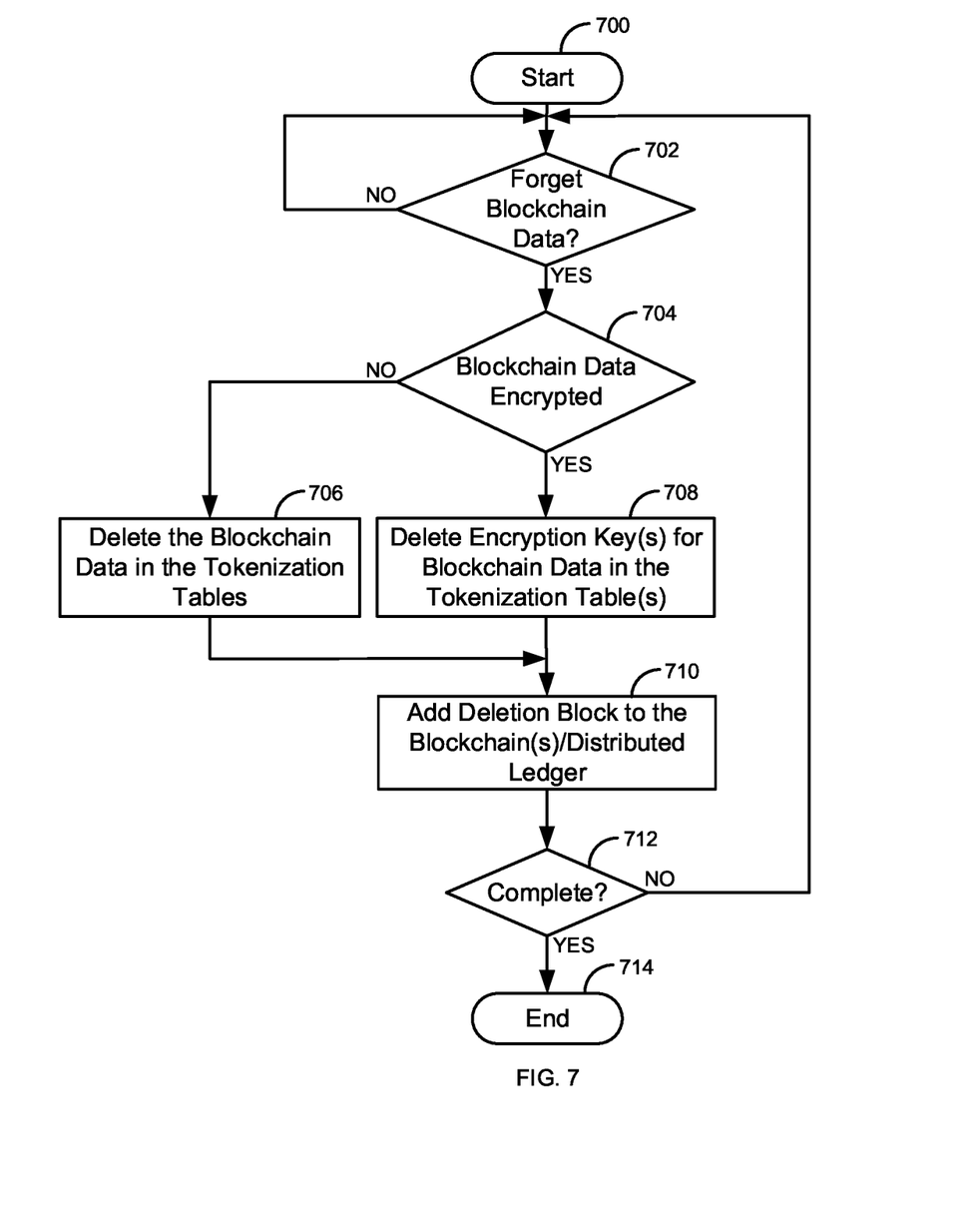
FIG. 7 is a flow diagram of a process for forgetting blockchain data using tokenization tables.
Figure 8:
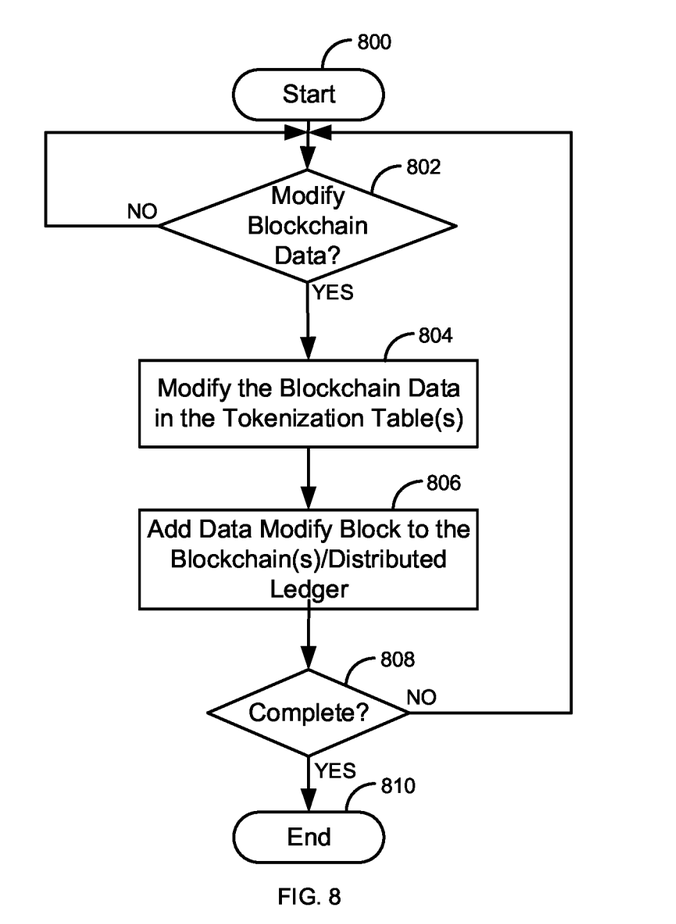
FIG. 8 is a flow diagram of a process for modifying blockchain data using tokenization tables.

FIG. 6 is a flow diagram of a process for adding forgettable blockchain data 211/311 to a blockchain 122 by using tokenization tables 102/302/402. Illustratively, the tokenization server(s) 101, the forget me manager 103/103A-103N, the encryption modules 104/104A-104N, the communication devices 120A-120N, and the blockchain managers 121A-121N, are stored-program-controlled entities, such as a computer or microprocessor, which performs the method of FIGS. 6-8 and the processes described herein by executing program instructions stored in a computer readable storage medium, such as a memory (i.e., a computer memory, a hard disk, and/or the like). Although the methods described in FIGS. 6-8 are shown in a specific order, one of skill in the art would recognize that the steps in FIGS. 6-8 may be implemented in different orders and/or be implemented in a multi-threaded environment. Moreover, various steps may be omitted or added based on implementation.

The process starts in step 600. The process determines, in step 602, if a transaction has occurred where the blockchain data 211/311 may need to be deleted or modified in the future. If there is no transaction or the blockchain data 211/311 is not going to need to be deleted/modified (e.g., there is only non-tokenized blockchain data 204 needed) the process of step 602 repeats.

Otherwise, if there is going to be deletable/modifiable blockchain data 211/311 in step 602, the process generates a transaction block 201 that has a token(s)/table identifier(s) 205 in step 604. The process adds the transaction block 201 to the blockchain 122/distributed ledger 130 in step 606. The process adds, in step 608, the blockchain data 211/311 to the tokenization table(s) 102/302/402. The process of step 608 may include initially generating the tokenization table(s) 102/302/402.

The process determines, in step 610, if the process is complete. If the process is not complete in step 610, the process goes back to step 602. Otherwise, the process ends in step 612.

FIG. 7 is a flow diagram of a process for forgetting blockchain data 211/311 using tokenization tables 102/302/402. The process starts in step 700. The process determines, in step 702, if an event has occurred to forget the blockchain data 211/311. For example, the event may be where a user/administrator has decided to forget the blockchain data 211/311 or where the blockchain data 211/311 is periodically deleted based on a data retention policy. If an event has not occurred in step 702, the process of step 702 repeats.

Otherwise, if an event has occurred to forget the blockchain data 211/311 in step 702, the process determines if the blockchain data 211/311 is encrypted in step 704. If the blockchain data 211/311 is encrypted blockchain data 311, the process permanently deletes, in step 708, the encryption key(s) for the blockchain data 311 in the tokenization table(s) 302. The process then goes to step 710. If the blockchain data 211 is not encrypted in step 704, the process deletes the blockchain data 211 in the tokenization tables 102/402 and then goes to step 710. In one embodiment, the event may request to forget encrypted blockchain data 311 and non-encrypted blockchain data 211. In this embodiment, both steps 706/708 may occur in parallel.

The process adds, a data deletion block 500, in step 710, to the blockchain 122/distributed ledger 130. The process of step 710 may be optional based on implementation.

The process determines, in step 712, if the process is complete. If the process is not complete in step 712, the process goes back to step 702. Otherwise, the process ends in step 714.

FIG. 8 is a flow diagram of a process for modifying blockchain data 211 using tokenization tables 102/402. The process starts in step 800. The process determines, in step 802, if there is an event that requires modification of the blockchain data 211. The modification event of step 802 may be based on a user/administrator action. If there is not an event that requires modification of the blockchain data 211 in step 802, the process of step 802 repeats.

Otherwise, if the event is to modify the blockchain data 211 in step 802, the process modifies the blockchain data 211 in the tokenization table(s) 102/402 in step 804. A data modify block 510 is added to the blockchain 122/distributed ledger 130 in step 806. The process of step 806 may be optional based on implementation.

The process determines, in step 808, if the process is complete. If the process is not complete in step 808, the process goes back to step 802. Otherwise, the process ends in step 810.

The processes described herein may be used in various types of applications, such as, voting, anonymous spending, or occasions in which you want to authenticate a transaction, but later remove some blockchain data 211/311 associated with the transaction. For example, the transaction block 201 is used to authenticate a legitimate vote, but the actual user blockchain data 211/311 may be removed by the user to ammonize the voting process.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
a microprocessor; and
a computer readable medium, coupled with the microprocessor and comprising microprocessor readable and executable instructions that, when executed by the microprocessor, cause the microprocessor to:
generate a first transaction block in a first blockchain, wherein the first transaction block in the first blockchain comprises a first token that points to first blockchain data and a first table identifier that identifies a first tokenization table where the first blockchain data associated with the first blockchain is provided;
generate a first transaction block in a second blockchain,
wherein the first transaction block in the second blockchain comprises a first token that points to first blockchain data and the first table identifier that identifies the first tokenization table where the first blockchain data associated with the second blockchain is provided and a second token that points to second blockchain data and a second table identifier that identifies a second tokenization table where the second blockchain data associated with the second blockchain is provided;
detect a first event, wherein the first event is to forget the first blockchain data associated with the first blockchain in the first tokenization table; and
in response to detecting the first event, forget the first blockchain data associated with the first blockchain in the first tokenization table,
wherein the first blockchain data associated with the first blockchain in the first tokenization table is covered by a tokenization hash in the first transaction block associated with the first blockchain, and
wherein the first tokenization table is different than the second tokenization table.

2. The system of claim 1, wherein the microprocessor readable and executable instructions further comprise instructions to: in response to the detecting first event, add a data deletion block to the first blockchain, wherein the first event includes enacting a data retention policy to have the first blockchain data associated with the first blockchain periodically deleted.

3. The system of claim 1, wherein the microprocessor readable and executable instructions further comprise instructions to:
detect a second event, wherein the second event is to modify second blockchain data associated with the first blockchain; and
in response to detecting the second event, add a data modification block to the first blockchain.

4. The system of claim 1, wherein the first blockchain comprises a second transaction block, wherein the second transaction block in the first blockchain comprises a second token that points to second blockchain data associated with the first blockchain and the second table identifier that identifies the second tokenization table where the second blockchain data associated with the first blockchain is provided.

5. The system of claim 1, wherein the first tokenization table is a common tokenization table and the second tokenization table is a private tokenization table.

6. The system of claim 1, wherein the first blockchain comprises a second transaction block, wherein the second transaction block in the first blockchain comprises a second token that points to second blockchain data associated with the first blockchain and the first table identifier that identifies the first tokenization table where the second blockchain data associated with the first blockchain is provided.

7. The system of claim 1, wherein the first blockchain data associated with the first blockchain is encrypted with a first encryption key and wherein forgetting the first blockchain data associated with the first blockchain in the first tokenization table comprises permanently deleting the first encryption key.

8. The system of claim 7, wherein the first tokenization table comprises second blockchain data associated with the first blockchain that is encrypted with a second encryption key and wherein the second blockchain data associated with the first blockchain is forgotten by permanently deleting the second encryption key.

9. The system of claim 8, wherein a size of the second encryption key is different from a size of the first encryption key and wherein a first user controls permanent deletion of first encryption key and a second user controls permanent deletion of the second encryption key.

10. The system of claim 1, wherein forgetting the first blockchain data associated with the first blockchain in the first tokenization table comprises permanently deleting the first blockchain data associated with the first blockchain.

11. The system of claim 1, wherein the first tokenization table is replicated in a distributed ledger and wherein a consensus vote by a plurality of communication devices in the distributed ledger is required to forget the first blockchain data associated with the first blockchain in the replicated tokenization table in the distributed ledger.

12. A method, comprising:
generating, by a microprocessor, a first transaction block in a first blockchain,
wherein the first transaction block in the first blockchain comprises a first token that points to first blockchain data and a first table identifier that identifies in a first tokenization table where the first blockchain data associated with the first blockchain is provided;
generating, by the microprocessor, a first transaction block in a second blockchain,
wherein the first transaction block in the second blockchain comprises a first token that points to first blockchain data and the first table identifier that identifies the first tokenization table where the first blockchain data associated with the second blockchain is provided and a second token that points to second blockchain data and a second table identifier that identifies a second tokenization table where the second blockchain data associated with the second blockchain is provided;
detecting, by the microprocessor, a first event, wherein the first event is to forget the first blockchain data associated with the first blockchain in the first tokenization table; and
in response to detecting the first event, forgetting, by the microprocessor, the first blockchain data associated with the first blockchain in the first tokenization table,
wherein the first blockchain data associated with the first blockchain in the first tokenization table is covered by a tokenization hash in the first transaction block associated with the first blockchain, and
wherein the first tokenization table is different than the second tokenization table.

13. The method of claim 12, further comprising: in response to the detecting first event, adding a data deletion block to the first blockchain, wherein the first event includes enacting a data retention policy to have the first blockchain data associated with the first blockchain periodically deleted.

14. The method of claim 12, further comprising:
detecting a second event, wherein the second event is to modify second blockchain data associated with the first blockchain; and
in response to detecting the second event, adding a data modification block to the first blockchain.

15. The method of claim 12, wherein the first blockchain comprises a second transaction block, wherein the second transaction block associated with the first blockchain in the first blockchain comprises a second token that points to second blockchain data associated with the first blockchain in the second tokenization table.

16. The method of claim 12, wherein the first blockchain data associated with the first blockchain is encrypted with a first encryption key and wherein forgetting the first blockchain data associated with the first blockchain in the first tokenization table comprises permanently deleting the first encryption key.

17. The method of claim 12, wherein forgetting the first blockchain data associated with the first blockchain in the first tokenization table comprises permanently deleting the first blockchain data associated with the first blockchain.

18. The method of claim 12, wherein the first tokenization table is replicated in a distributed ledger and wherein a consensus vote by a plurality of communication devices in the distributed ledger is required to forget the first blockchain data associated with the first blockchain in the replicated tokenization table in the distributed ledger.

19. A non-transient computer readable medium having stored thereon instructions that cause a processor to execute a method, the method comprising:
instructions to:
generate a first transaction block in a first blockchain,
wherein the first transaction block in the first blockchain comprises a first token that points to first blockchain data and a first table identifier that identifies in a first tokenization table where the first blockchain data associated with the first blockchain is provided;
generate a first transaction block in a second blockchain,
wherein the first transaction block in the second blockchain comprises a first token that points to first blockchain data and the first table identifier that identifies the first tokenization table where the first blockchain data associated with the second blockchain is provided and a second token that points to second blockchain data and a second table identifier that identifies a second tokenization table where the second blockchain data associated with the second blockchain is provided;
detect an event, wherein the event is to forget the first blockchain data associated with the first blockchain in the first tokenization table; and
in response to detecting the event, forget the first blockchain data associated with the first blockchain in the first tokenization table,
wherein the first blockchain data associated with the first blockchain in first the tokenization table is covered by a tokenization hash in the first transaction block associated with the first blockchain, and
wherein the first tokenization table is different than the second tokenization table.

20. The non-transient computer readable medium of claim 19, wherein the processor and the method further comprise instructions to: in response to the detect event, add a data deletion block to the first blockchain, wherein the event includes enacting a data retention policy to have the first blockchain data associated with the first blockchain periodically deleted.

* * * * *